United States Patent [19]
Yin

[11] Patent Number: 5,747,890
[45] Date of Patent: May 5, 1998

[54] POWER SUPPLY SWITCH REFERENCE CIRCUITRY

[75] Inventor: Rong Yin, Coppell, Tex.

[73] Assignee: SGS-Thomson Microelectronics, Inc., Carrollton, Tex.

[21] Appl. No.: 464,082

[22] Filed: Jun. 5, 1995

[51] Int. Cl.$^6$ ............................................. H02J 1/00
[52] U.S. Cl. ............................ 307/87; 307/64; 365/229
[58] Field of Search ............................ 365/226, 227, 365/228, 229; 307/43, 44, 64, 66, 85, 86, 87

[56] References Cited

U.S. PATENT DOCUMENTS

| | | | |
|---|---|---|---|
| 5,278,798 | 1/1994 | Mijawaki | 365/229 |
| 5,426,616 | 6/1995 | Kajigaya et al. | 365/226 |
| 5,541,880 | 7/1996 | Campardo et al. | 365/189.09 |

*Primary Examiner*—William M. Shoop, Jr.
*Assistant Examiner*—Jonathan S. Kaplan
*Attorney, Agent, or Firm*—Theodore E. Galanthay; Kenneth C. Hill; Lisa K. Jorgenson

[57] ABSTRACT

An apparatus and method for switching between two power supplies, a primary power supply and a secondary power supply. The present invention generates a first reference voltage using the voltage of the primary power supply and the secondary power supply, wherein the primary power supply voltage is variable. The present invention also generates a second reference voltage based on the voltage of the primary power supply. The first and second reference voltages each have a different slope and the crossing point between these two reference voltages indicate that a switch between the primary power supply and the secondary power supply should occur.

19 Claims, 3 Drawing Sheets

POWER SUPPLY SWITCH REFERENCE CIRCUITRY

BACKGROUND OF THE INVENTION

1. Technical Field

The present invention relates to integrated circuits and in particular to MOS integrated circuits. Still more particularly, the present invention relates to switch circuitry for switching between power supplies.

2. Description of the Related Art

In some situations, it is desirable to provide retention of data in integrated circuits such as memory devices. A number of circuits are commercially available for retaining data in SRAMS when power is removed. An example of one such device may be found in U.S. Pat. No. 5,099,453, entitled *Configuration Memory For Programmable Logic Device*, U.S. Pat. No. 4,713,555, entitled *Battery Charging Protection Circuit*; U.S. Pat. No. 4,122,359, entitled *Memory Protection Arrangement*; and U.S. Pat. No. 4,451,742, entitled *Power Supply Control For Integrated Circuit*. These devices are often known as "zero power circuits". Typically, in a zero power circuit, the contents of the circuit are protected in the event that the power supply voltage to that circuit drops below some predetermined or selected threshold voltage i.e., the voltage of a secondary power supply. This protection may be accomplished by switching the circuit from a primary power apply to a secondary power supply, typically an internal battery, when the voltage of the primary power supply drops below that of the secondary power supply.

Power control circuits exist which provide automatic sensing of a primary power source voltage. These power control circuits provide for automatic switching to a secondary power source when the primary power source voltage drops below a predetermined threshold voltage.

Typically, a comparator is employed to compare the voltage of the external power source with the voltage of a predetermined threshold, which is typically the voltage of the battery power supply. When the external power supply voltage drops below the voltage of the battery power supply voltage, the circuit typically switches the integrated circuit to the battery power supply from the external power supply. Such a system works well for integrated circuit systems that employ 5.0 volt power supplies. Problems, however, occur for integrated circuit systems running on power supply voltages at 3.0 volts. In particular, these powers supply voltages may range about from 2.7 to about 4.0 volts. As a result, at various times the external power supply voltage may drop below that of the battery supply power voltage. Therefore, it would be advantageous to have a method and apparatus for switching power supplies that does not rely on the voltage of the battery power supply as a reference voltage to switch power supplies.

SUMMARY OF THE INVENTION

The present invention provides an apparatus and method for switching between two power supplies, a primary power supply and a secondary power supply. The present invention generates a first reference voltage using the voltage of the primary power supply and the secondary power supply, wherein the primary power supply voltage is variable. The present invention also generates a second reference voltage based on the voltage of the primary power supply. The first and second reference voltages each have a different slope and the crossing point between these two reference voltages indicate that a switch between the primary power supply and the secondary power supply should occur.

Typically, the primary power supply is an external power supply to a integrated circuit, and the secondary power supply is a battery power supply that is used when the primary power supply voltage drops below some preselected level. The primary power supply voltage is reconnected to the integrated circuit when it exceeds the preselected level. These preselected levels are selected by adjusting the crossing point between the first and second reference voltages according to the present invention.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
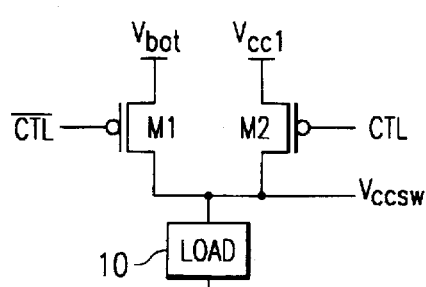
FIG. 1 is a diagram of a integrated circuit system that is powered both a primary and a secondary power supply.

With reference now to the figures, and in particular with reference to FIG. 1 is a diagram of a integrated circuit system that is powered both a primary and a secondary power supply. Load 10 is connected to either power supply voltage $V_{bat}$ or $V_{cc1}$. Power supply voltage $V_{bat}$ is a fixed power supply voltage while power supply voltage $V_{cc1}$ is a varied power supply voltage. The power supply voltage connected to load 10 is controlled by transistors M1 and M2. Load 10 is connected to lower power supply voltage $V_{ss}$, which is a power supply voltage having a voltage less than either power supply voltage $V_{bat}$ or $V_{cc1}$. The gates of transistors M1 and M2 are controlled by control signals CTL and $\overline{CTL}$.

Figure 2:
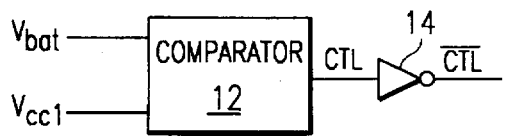
FIG. 2 depicts a circuit for generating control signals known in the art.

Presently, these control signals are generated by the circuit system shown in FIG. 2. Power supply voltage $V_{bat}$ is employed as a switching reference point in the prior art. When power supply voltage $V_{cc1}$ is less than power supply voltage $V_{bat}$, the internal power supply voltage $V_{ccsw}$ is equal to power supply voltage $V_{bat}$. When power supply voltage $V_{cc1}$ is greater than power supply voltage $V_{bat}$, the internal power supply voltage $V_{ccsw}$ is equal to power supply voltage $V_{cc1}$. Comparator 12 generates a control signal CTL in response to a comparison of voltages $V_{bat}$ and $V_{cc1}$ at its input. Control signal $\overline{CTL}$ is generated by inverter 14. Control signals CTL and $\overline{CTL}$ are complimentarily control signals that are generated at the output of the comparator. For a 3.0 volt integrated circuit system, the battery voltage cannot be used as a switching reference. As a result, different voltages are employed to set up the switching point.

Figure 3:
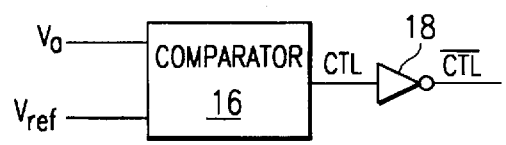
FIG. 3 is a circuit for generating control signals.

According to the present invention, the control signals CTL and $\overline{\text{CTL}}$ for switching power supplies in the circuit system of FIG. 1 are generated by the circuit of FIG. 3 by comparator 16 with inputs for voltage $V_a$ and $V_{ref}$ according to the present invention. The control signal $\overline{\text{CTL}}$ is generated by inverter 18.

Figure 4:
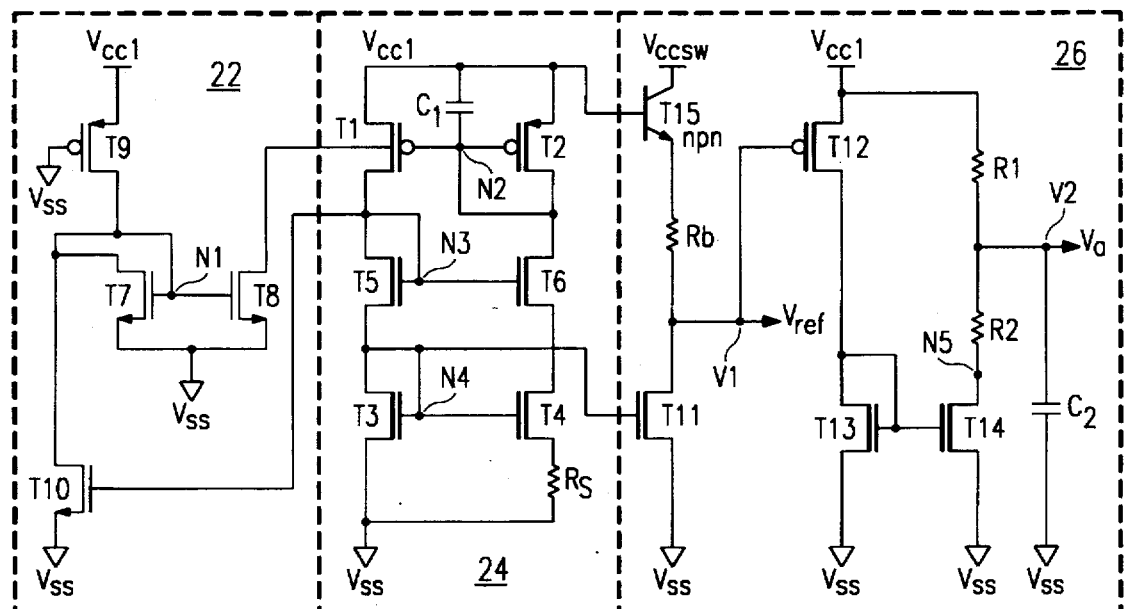
FIG. 4 depicts a schematic diagram of a circuit for generating signals for detecting a switching point according to the present invention.

FIG. 4 depicts a schematic diagram of a switching reference circuit for generating signals for detecting a switching point. According to the present invention, a switching reference circuit 20 is depicted. Switching reference circuit 20 generates signals to used detect a switching point to switch between power supplies by circuiting such as the circuit depicted in FIG. 3 according to the present invention. Switching reference circuit 20 includes a start-up circuit 22, a current source circuit 24, and a reference circuit 26.

Start-up circuit 22 includes transistors T7–T10. Transistors T7, T8, and T10 are N-channel metal-oxide-semiconductor field effect transistors (MOSFETs) according to the present invention. Transistor T9 is a P-channel MOSFET. The source of transistor T9 is connected to power supply $V_{cc1}$ while the source of transistor T10 is connected to power supply voltage $V_{ss}$. Power supply voltage $V_{cc1}$ is higher than power supply voltage $V_{ss}$. Power supply voltage $V_{ss}$ is typically a ground power supply voltage. Start-up circuit 22 is employed to start current flow within current source circuit 24.

Current source circuit 24 includes transistors T1–T6. Transistors T1–T6 are MOSFETs according to the preset invention. Current source circuit 24 also includes a capacitor C1 and a resistor RS. The current in current source circuit 24 is determined by resistor RS. Transistors T1 and T2 are P-channel MOSFETs according to the present invention while transistors T3–T6 are N-channel MOSFETs according to the present invention. Transistors T1 and T2 have sources connected to power supply voltage $V_{cc1}$. Capacitor C1 also is connected to power supply voltage $V_{cc1}$. The gates of transistors T1 and T2 are controlled by the current passing through transistor T8 in start-up circuit 22. Transistors T5 and T6 are used to provide a more precise current.

Figure 5:
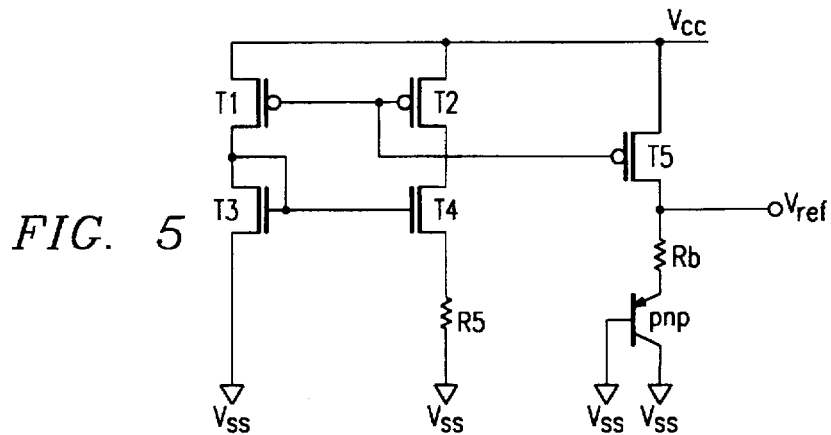
FIG. 5 is a schematic diagram of a reference circuit implemented in a N-well CMOS process.

Reference circuit 26 contains transistors T11–T15. Transistors T11, T13, and T14 are N-channel MOSFETs with transistor T12 being a P-channel MOSFET. Transistor T15 is a NPN bipolar transistor according to the present invention. The circuit of the present invention in the depicted example is implemented using a p-well CMOS process. In a N-well CMOS process, a PNP bipolar transistor would be employed as depicted in FIG. 5. Start-up circuit 22 is connected a power supply voltage $V_{cc1}$ and a ground power supply voltage $V_{ss}$. Reference circuit 26 is connected to power supply voltage $V_{ccsw}$ which may be either power supply voltage $V_{cc1}$ or $V_{ccbat}$ which is the battery back up power supply voltage. This connection to power supply voltage $V_{ccsw}$ is made through the collector of transistor T15. Reference circuit 26 also is connected to power supply voltage $V_{cc1}$ and a lower power supply voltage $V_{ss}$. Transistor T12 is connected to power supply $V_{cc1}$ while transistors T11, T13, and T14 are connected to power supply voltage $V_{ss}$. A connection to power supply voltage $V_{ss}$ is also made through a capacitor C2. The gate of transistor T12 is controlled by the voltage $V_{ref}$ at node V1, which is the voltage drop across transistor T11. Power supply voltage $V_{cc1}$ is the external power supply voltage. Reference circuit 26 also includes resistors RB, R1 and R2. Reference circuit 26 generates a voltage $V_{ref}$ from node V1, which is the voltage from node V1 to the lower power supply voltage or ground. Reference circuit 26 also generates a voltage $V_a$ at node V2, which is the voltage drop across capacitor C2 to power supply voltage $V_{ss}$. Voltages $V_{ref}$ and $V_a$ are the signals employed to determine when to switch between two power supplies according to the present invention. The function of switching control circuit is described in more detail below.

When power supply voltage $V_{cc1}$ rises, current flows through transistor T9 towards node N1, which results in the voltage at node N1 to increase. The increase of voltage $V_{cc1}$ causes the current traveling through transistors T7 and T9 to increase. The current flowing through transistor T7 is equal to the current through transistor T9. Transistor T8 is mirrored to transistor T7, which results in the current through transistor T8 also increasing. The voltage at node N2 drops as the current through transistors T7–T9 increases. The drop in voltage at node N2 results in transistors T1 and T2 being turned on allowing current to flow through these two transistors. In response, the voltage at node N3 goes up turning on transistor T10 in start-up circuit 22. In response, transistor TlO pulls the voltage at node N1 down disabling start up circuit 22. At this time, all of the transistors T1–T6 are working in a weak inversion region. The current through these transistors is low. Capacitor C1 is added to hold the voltage low at node N2 for a short period of time to allow current source circuit 24 sufficient time to generate current. Current source circuit 24 is employed to generate the current for creating voltages $V_{ref}$ and $V_a$ based on power supply voltage $V_{cc1}$.

Capacitor C2 is employed to respond to frequency changes. Thus, if noise occurs from the power supply, $V_{ref}$ and $V_a$ should follow each other.

Voltage $V_{ref}$ at node V1 is temperature independent and is about $V_{cc1}$ −0.5 V initially and then settles to a stable value after the current source is stabilized. This value for $V_{ref}$ is calculated as follows:

$$V_{ref} = V_{CC1} - V_{BE} - K\left(\frac{kT}{q}\right)\left(\frac{Rb}{Rs}\right)\ln\frac{S_4 S_1}{S_2 S_3} \quad (1)$$

where $V_{BE}$ is the base emitter voltage of transistor T15; K is the ratio of the current mirror T3 and T11, $S_i$ is the device size (W/L)i for i=1, 2, 3, and 4 $S_1$ is the device size of the first transistor ($T_1$) in current source 24, $S_2$ is the device size of the second transistor ($T_2$) in current source 24, $S_3$ is the device size of the third transistor ($T_3$) in current source 24, $S_4$ is a device size of the fourth transistor ($T_4$) in current source 24, kT/q is the thermal voltage. The voltage $V_{ref}$ controls transistor T12 with node N5 being pulled to ground. The voltage $V_a$ is switched from $V_{cc1}$ to R2/(R1+R2) $V_{cc1}$.

Figure 6:
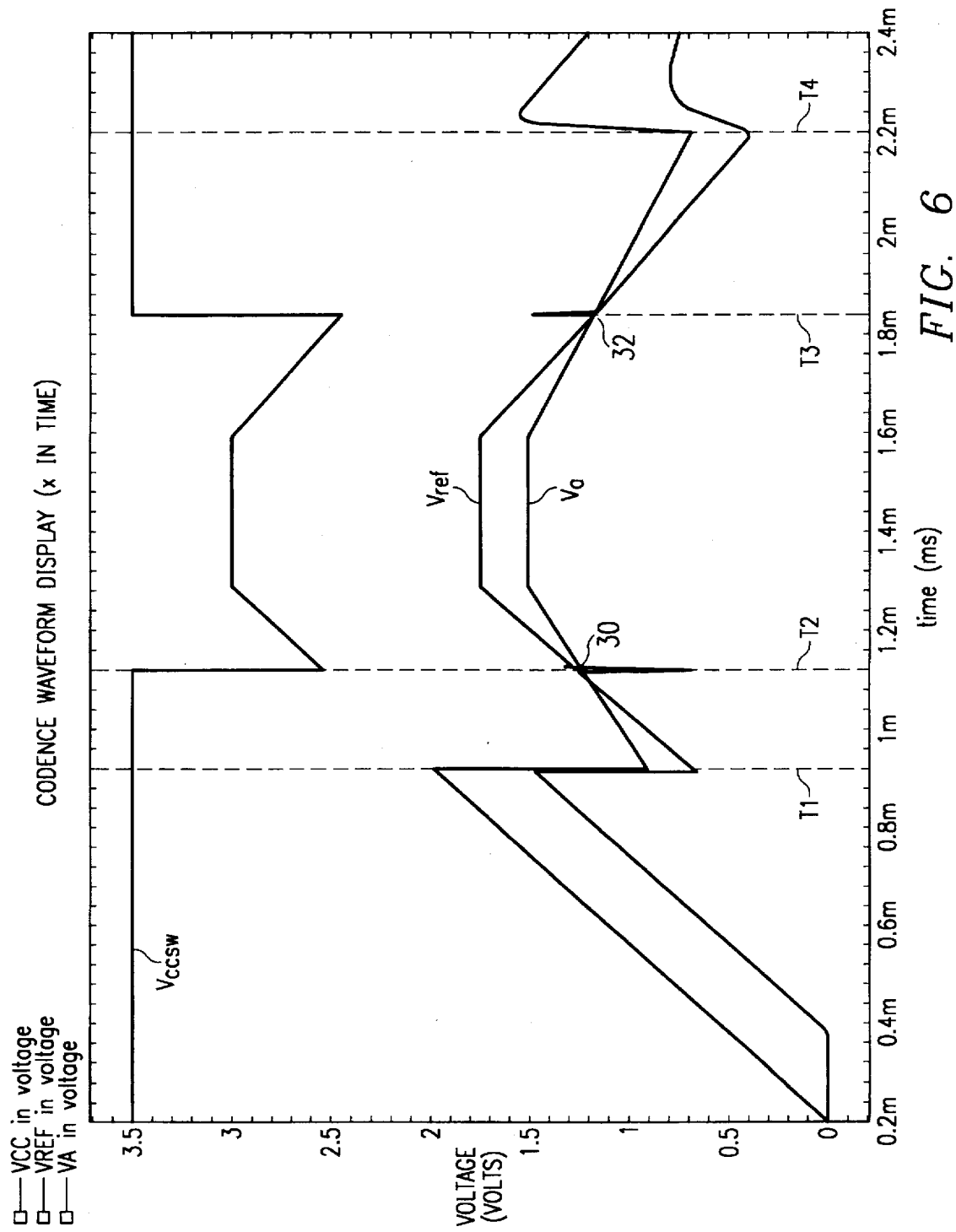
FIGS. 6 and 7 depict graphs of voltages $V_{cc1}$, $V_{bat}$, $V_{ref}$, and $V_a$ according to the present invention.
Figure 7:
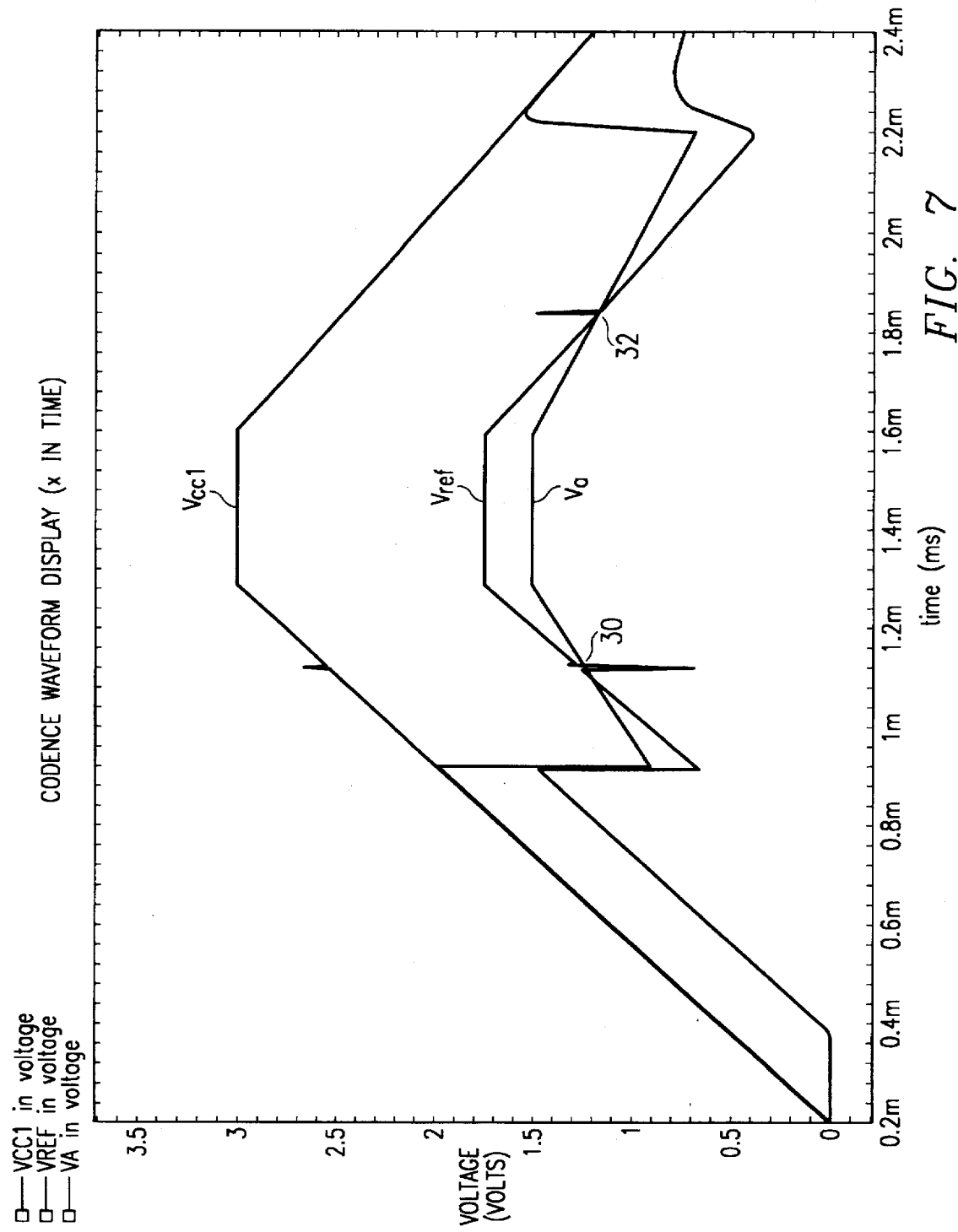

With reference to FIGS. 6 and 7, graphs of voltages $V_{cc1}$, $V_{bat}$, $V_{ref}$ and $V_a$ are depicted according to the present invention. In these two graphs, the X-axis is time in milliseconds and the Y-axis is voltage. Crossing point 30 is the point at which the load or circuitry is switched from the battery power supply to the primary power supply. Crossing point 32 is the point at which the load or circuit is switched from the primary power supply to the battery power supply. Voltage $V_{ref}$ is based on voltages $V_{cc1}$ and $V_{ccsw}$ as can be seen with reference back to FIG. 4 and equation 1. As can be seen, when voltage $V_{ref}$ is greater than $V_a$, the power supply is switched from $V_{bat}$ to $V_{cc1}$. The resistor ratio R2/(R1+R2) determines the crossing point, the point at which $V_a$ and $V_{ref}$ cross each other, for switching between power supplies. The voltage $V_{ref}$ always follows $V_{cc1}$. In other words, $V_{ref}$ has the same slope as $V_{cc1}$. Voltage $V_a$ has a different slope from $V_{ref}$ The slope of voltage $V_a$ is determined by resistors R1 and R2 in FIG. 4. After crossing point 30, voltage $V_{ref}$ is based only on voltage $V_{cc1}$ without any influence from voltage $V_{bat}$ because at that point, the power supply voltage $V_{ccsw}$ has been switched from the battery power supply generating voltage $V_{bat}$ to power supply voltage generating voltage $V_{cc1}$. The power supply voltage $V_{ccsw}$ is switched back to $V_{bat}$ after time T3.

In the depicted example, the battery voltage $V_{bat}$ is 3.5 volts and the crossing points 30 and 32, the voltage at which $V_a$ and $V_{ref}$ cross has been set to 2.3 volts. The crossing point may be altered by changing values for resistors R1 and R2 in FIG. 4. Also, the battery current $I_{bat}$ is used by the switching reference circuit only between times T1 and T2 and T3 and T4. At other points in the graph in FIG. 6, the current $I_{bat}$ in the switching reference circuit is equal to 0.

One advantage of the present invention is that the switching circuit may be employed for any type of $V_{cc}$ part with requiring only a small battery current during a short switching period. The present invention also provides an advantage of allowing different reference points to be set for switching between power supplies. The present invention may be implemented for integrated circuit parts using various power supply voltages, such as 5.0 and 3.3 volts. The present invention provides low battery currents during switching periods, which is defined as the time between the starting of the circuitry and the crossing point to switching power supplies. As a result, under the present invention, battery life is not affected by the switching reference circuit.

The present invention is depicted using MOS technology. Other types of technology in transistors may be used according to the present invention.

While the invention has been particularly shown and described with reference to a preferred embodiment, it will be understood by those skilled in the art that various changes in form and detail may be made therein without departing from the spirit and scope of the invention.

What is claimed is:

1. A power supply switching circuit for switching power supplies to a load, the power supply switching circuit comprising:
    a switching circuit connected to two power supplies supplying two voltages, a primary power supply and a secondary power supply, the primary power supply providing a first voltage and the secondary power supply providing a second voltage, the first voltage being a variable voltage wherein the switching circuit is controlled by a control signal, the control signal causing one of the two power supplies to be connected to the load, wherein one of the two voltages is connected to the load;
    a reference circuit including:
        means for generating a first reference voltage utilizing the first voltage and a switched voltage, the switched voltage being switched between the first voltage and the second voltage, wherein the first voltage reference has a first slope; and
        means for generating a second reference voltage utilizing the first voltage, wherein the second reference voltage has a second slope that is selected to provide a crossing point with the first reference voltage,
    wherein the switching circuit switches between the two power supplies in response to an occurrence of a crossing point between the first reference voltage and the second reference voltage.

2. The power supply switching circuit of claim 1, wherein both the first reference voltage and the second reference voltage are lower than the secondary power supply voltage.

3. The power supply switching circuit of claim 2, wherein the secondary power supply is a battery power supply.

4. The power supply switching circuit of claim 1, wherein both the first and second reference voltages are less than the first voltage.

5. The power supply switching circuit of claim 1, wherein the slope of the second reference voltage is selected as follows:

$$\frac{R_2}{R_1 + R_2}$$

wherein $R_1$ and $R_2$ are resistor values.

6. The power supply switching circuit of claim 2, wherein the secondary power supply voltage is greater than the primary power supply voltage.

7. A power supply switching circuit for switching power supplies to a load, the power supply switching circuit comprising:
    a switching circuit connected to two power supplies supplying two voltages, a primary power supply and a secondary power supply, wherein the primary power supply generates a first voltage and the secondary power supply generates a second voltage, wherein the switching circuit is controlled by control signal, the control signal causing one of the two power supplies to be connected to the load, wherein one of the two voltages is connected to the load;
    a comparator circuit having a first input connected to a first input reference voltage, a second input connected to a second reference voltage, and an output, connected to the switching circuit, wherein the control signal is generated at the output;
    a reference voltage circuit including:
        a first circuit comprising a first transistor having a base, a collector, and an emitter, the collector being having a connection that is switched between the first voltage and the second voltage in response to the switching circuit connecting one of the two power supplies to the load, a second transistor having a gate, a source, and a drain, and a resistor, having a first end and a second end wherein the drain of the second transistor is connected to the first end of the resistor and the second end of the resistor is connected to the emitter of the first transistor, wherein the first reference voltage is equal to voltage drop across the second transistor, wherein the drain of the second transistor is connected to the first input of the comparator circuit; and
        a second circuit comprising a first resistor and a second resistor connected in series, wherein the first resistor has a first end connected to the first voltage and a second end connected to a first end of the second resistor, wherein the second reference voltage is equal to a voltage drop across the second resistor and wherein the first end of the second transistor is connected to the second input of the comparator circuit.

8. The power supply switching circuit of claim 7, further comprising a current source including:
    a first transistor and a second transistor, each transistor having a source, a drain, and a gate, the sources of the first transistor and the second transistor being connected to the first voltage, the gate of the first transistor and the second transistor being connected to the drain of the second transistor;
    a third transistor and a fourth transistor, each transistor having a source, a drain, and a gate, the drain of the third transistor being connected to the drain of the first transistor, the drain of the fourth transistor being connected to the drain of the second transistor, and the gates of the third transistor and the fourth transistor being connected to the drain of the third transistor; and a fifth transistor and a sixth transistor, each transistor having a source, a drain, and a gate, the drain of the fifth transistor being connected to the source of the third transistor, the drain of the sixth transistor being connected to the source of the fourth transistor, the sources of the fifth transistor and the sixth transistor being connected to a lower power supply voltage, and the gates of the fifth transistor and the sixth transistor being connected to the drain of the fifth transistor, wherein the gate of the fifth transistor in the current source is connected to a gate of the second transistor in the reference circuit and wherein the source of the sixth transistor is connected to the lower power supply by a resistor having a first end connected to the source of the sixth transistor and a second end connected to the lower power supply voltage.

9. The power supply switching circuit of claim 7, wherein in the second circuit, the second end of the second resistor is connected to the lower power supply voltage by a transistor having a drain connected to the second end of the resistor and a source connected to the lower power supply voltage, wherein the transistor has a gate controlled by the first reference voltage.

10. The power supply switching circuit of claim 7, wherein the first transistor is a PNP transistor.

11. The power supply switching circuit of claim 7, wherein the first transistor is an NPN transistor.

12. The power supply switching circuit of claim 10, wherein the second transistor is an N-channel MOSFET.

13. The power supply switching circuit of claim 9, further comprising a current source including a first transistor, a second transistor, a third transistor, and a fourth transistor, wherein the first reference voltage is generated as followings:

$$V_{ref} = V_{CC1} - V_{BE} - K \left( \frac{kT}{q} \right) \left( \frac{Rb}{Rs} \right) \ln \frac{S_4 S_1}{S_2 S_3}$$

wherein $V_{ref}$ is the first reference voltage, $V_{cc1}$ is the first voltage, $V_{BE}$ is a base emitter voltage of the first transistor in the first circuit, $S_1$ is the device size of the first transistor in the current source, $S_2$ is the device size of the second transistor in the current source, $S_3$ is the device size of the third transistor in the current source, $S_4$ is a device size of the fourth transistor in the current source, kT/q is the thermal voltage, Rb is the resistor in the first circuit, and Rs is the resistor in the current source.

14. The power supply switching circuit of claim 7, further comprising:

a current source including:

a first transistor and a second transistor, each transistor having a source, a drain, and a gate, the sources of the first transistor and the second transistor being connected to the first voltage and the gate of the first transistor and the second transistor being connected to the drain of the second transistor; and a third transistor and a fourth transistor, each transistor having a source, a drain, and a gate, the drain of the third transistor being connected to the drain of the first transistor, the drain of the fourth transistor being connected to the drain of the second transistor, the sources of the third transistor and the fourth transistor being connected to the lower power supply, and the gates of the third transistor and the fourth transistor being connected to the drain of the third transistor;

wherein the gate of the third transistor in the current source is connected to a gate of the second transistor in the reference circuit.

15. The power supply switching circuit of claim 14, wherein in the second circuit, the second end of the second resistor is connected to the lower power supply voltage by a transistor having a drain connected to the second end of the resistor and a source connected to the lower power supply voltage, the transistor having a gate controlled by the reference voltage.

16. The power supply switching circuit of claim 15, wherein the first reference voltage is determined as follows:

$$V_{ref} = V_{CC1} - V_{BE} - K \left( \frac{kT}{q} \right) \left( \frac{Rb}{Rs} \right) \ln \frac{S_4 S_1}{S_2 S_3}$$

wherein $V_{ref}$ is the first reference voltage, $V_{cc1}$ is the first voltage, $V_{BE}$ is a base emitter voltage of the first transistor in the first circuit, $S_1$ is the device size of the first transistor in the current source, $S_2$ is the device size of the second transistor in the current source, $S_3$ is the device size of the third transistor in the current source, $S_4$ is a device size of the fourth transistor in the current source, kT/q is the thermal voltage, Rb is the resistor in the first circuit, and Rs is the resistor in the current source.

17. The power supply switching circuit of claim 16, wherein the second reference voltage is determined as follows:

$$V_a = \frac{R_2}{R_1 + R_2} V_{cc1}$$

wherein $V_a$ is the second reference voltage, R1 is a resistor value of the first resistor in the second circuit, R2 is a resistor value of the second resistor in the second circuit, and $V_{cc}$ is the first voltage.

18. A power supply switching circuit for switching power supplies to a load, the method comprising:

a switching circuit connected to two power supplies, a primary power supply and a secondary power supply, wherein the switching circuit causes one of the two power supplies to be connected to the load;

a circuit including:

generating means for generating a first reference voltage utilizing the first voltage and a switched voltage, the switched voltage being switched between the first voltage and the second voltage, wherein the first voltage reference has a first slope; and generating means for generating a second reference voltage utilizing the first voltage, wherein the second reference voltage has a second slope that is selected to provide a crossing point with the first reference voltage, wherein the switching means for switching circuits switches between the two power supplies in response to an occurrence of a crossing point between the first reference voltage and the second reference voltage.

19. A method for switching between a primary power supply and a secondary power supply, wherein the primary power supply voltage provides a first voltage and the secondary power supply voltage provides a second voltage, the method comprising:

generating a first reference voltage utilizing the first voltage and a switched voltage, the switched voltage being switched between the first voltage and the second voltage, wherein the first reference voltage has a first slope;

generating a second reference voltage utilizing the first voltage, wherein the second reference voltage has a second slope, wherein the second slope is selected to provide a crossing point with the first reference voltage; and switching between the primary and secondary power supplies in response to an occurrence of the crossing point between the first reference voltage and the second reference voltage.

* * * * *